(12) United States Patent
Donivan

(10) Patent No.: US 9,221,485 B2
(45) Date of Patent: Dec. 29, 2015

(54) SPORTS CART

(71) Applicant: Kaylah Donivan, Forestville, CA (US)

(72) Inventor: Kaylah Donivan, Forestville, CA (US)

(*) Notice: Subject to any disclaimer, the term of this patent is extended or adjusted under 35 U.S.C. 154(b) by 0 days.

(21) Appl. No.: 14/184,432

(22) Filed: Feb. 19, 2014

(65) Prior Publication Data

US 2014/0239616 A1    Aug. 28, 2014

Related U.S. Application Data

(60) Provisional application No. 61/850,831, filed on Feb. 25, 2013.

(51) Int. Cl.
*B62B 3/02* (2006.01)
*B62B 7/08* (2006.01)
*B62B 5/06* (2006.01)
*B62B 7/04* (2006.01)
*B62B 9/26* (2006.01)

(52) U.S. Cl.
CPC . *B62B 3/02* (2013.01); *B62B 5/065* (2013.01); *B62B 7/044* (2013.01); *B62B 7/08* (2013.01); *B62B 9/26* (2013.01); *B62B 2202/42* (2013.01); *B62B 2205/006* (2013.01); *B62B 2205/10* (2013.01)

(58) Field of Classification Search
CPC ............ B62B 3/02; B62B 7/08; B62B 7/044; B62B 5/065; B62B 9/26; B62B 2205/10; B62B 2205/006; B62B 2202/42
USPC ............................. 280/38, 641, 646, 651, 655
See application file for complete search history.

(56) References Cited

U.S. PATENT DOCUMENTS

| | | | | |
|---|---|---|---|---|
| 5,193,842 A   * | 3/1993  | Fontenot | ........................ | 280/645 |
| 6,299,195 B1 * | 10/2001 | Chan     | ............................. | 280/651 |
| 8,104,777 B2 * | 1/2012  | Liao     | ................................ | 280/38  |
| 2009/0066056 A1 * | 3/2009  | Liao  | ............................. | 280/297 |
| 2012/0025481 A1 * | 2/2012  | Wu    | ................................ | 280/38  |
| 2012/0261908 A1 * | 10/2012 | Liao  | ............................. | 280/651 |
| 2013/0026738 A1 * | 1/2013  | Liao  | ............................. | 280/651 |
| 2013/0300090 A1 * | 11/2013 | Wang  | ............................ | 280/651 |

* cited by examiner

*Primary Examiner* — Brodie Follman
*Assistant Examiner* — Brian Cassidy
(74) *Attorney, Agent, or Firm* — William Wigert; Nathan Koenig

(57) ABSTRACT

A sports cart with a folding tubular frame, a central steering column, a pair of real wheels, a centrally located front wheel, a lower basket member, a secondary holding rack, a handlebar assembly, a front wheel fork assembly, a brake member, a steering column to handlebar assembly folding and locking joint and a steering column telescoping member. The secondary holding rack forms a portion of the folding frame and includes centrally located upper and lower tubes that rotatably retain the central steering column. The lower basket member is attached to the lower portion of the horizontally folding frame. The secondary holding rack includes a folding lower support portion. The front wheel, front wheel fork and the rear wheels are easily detachable and capable of fitting within the lower basket member. A preferred embodiment includes a standard braking assembly engaging the front wheel.

7 Claims, 8 Drawing Sheets

SPORTS CART

CROSS REFERENCE TO RELATED APPLICATIONS

This application claims benefit of prior filed provisional application No. 61/850,831 titled Sports Cart by same inventor, Kayiah Donivan, filed on Feb. 25, 2013.

STATEMENT REGARDING FEDERALLY SPONSORED RESEARCH OR DEVELOPMENT

Description of Attached Appendix

Not Applicable

BACKGROUND OF THE INVENTION

This invention relates generally to the field of wheeled carts and more specifically to a cart that facilitates sports activities such as jogging or skating.

Rolling, hand pushed carts for the transport of items is well known. Carts may be two wheeled, three wheeled or four wheeled.

Light weight folding carts have been and continue to be used for the transport of items such as groceries or other items purchased at local retail establishments, or for transporting sports equipment. These carts fulfill an important need in that they allow people to transport items from one location to another without needing to use motorized vehicles thereby saving fuel costs and providing valuable exercise for the user. However, there is a deficiency in the prior technology because existing carts are not designed to be easily used by a person who wants to jog or walk quickly while pushing the cart. Additionally, most current carts have small wheels which make them impractical for traversing dirt trails or uneven road surfaces. Also, most traditional carts do not have easily removable and replaceable wheels for compact storage or shipping. Three wheeled jogging strollers exist in the marketplace but are not steerable by a central rotatable steering column. W. Ayre's patent application 2006/0255564, now abandoned, discloses a steerable cart, but the folding mechanism is vertical in nature and wheels are not easily detachable for compact storage. Additionally, the application shows the invention used as a baby stroller but does not clearly define its use as a cart for transporting other items. Finally, no carts currently found include a secondary storage rack that supplements the primary cargo holding basket.

BRIEF SUMMARY OF THE INVENTION

The primary object of the invention is to provide a mobile cargo device that also facilitates exercise activities.

Another object of the invention is to provide a mobile cargo device that can fold into a compact form for storage or shipping.

Another object of the invention is to provide a mobile cargo device that has direct steering capability and easy to maneuver.

A further object of the invention is to provide a mobile cargo device that includes a primary carrying basket and a secondary carrying rack that can hold substantial cargo.

Yet another object of the invention is to provide a mobile cargo device that is adjustable for people of different heights and jogging stride lengths.

Another object of the invention is to provide a mobile cargo device that traverses dirt trails, rough roads and sidewalks.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a sports cart comprising: a horizontally folding tubular frame, a central steering column, a pair of real Meals, a centrally located front wheel, a lower basket member, a secondary holding rack, a handlebar assembly, a front wheel fork assembly, a brake member, a steering column to handlebar assembly folding and locking joint, a steering column telescoping member, said secondary holding rack forming a portion of said horizontally folding frame and including centrally located upper and lower tubes rotatably retaining said central steering column, said lower basket member attached to the lower portion of said horizontally folding frame, said secondary holding rack including a folding lower support portion, and said front wheel, front wheel fork and said rear wheels easily detachable and capable of fitting within said lower basket member.

BRIEF DESCRIPTION OF THE DRAWINGS

The drawings constitute a part of this specification and include exemplary embodiments to the invention, which may be embodied in various forms. It is to be understood that in some instances various aspects of the invention may be show exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
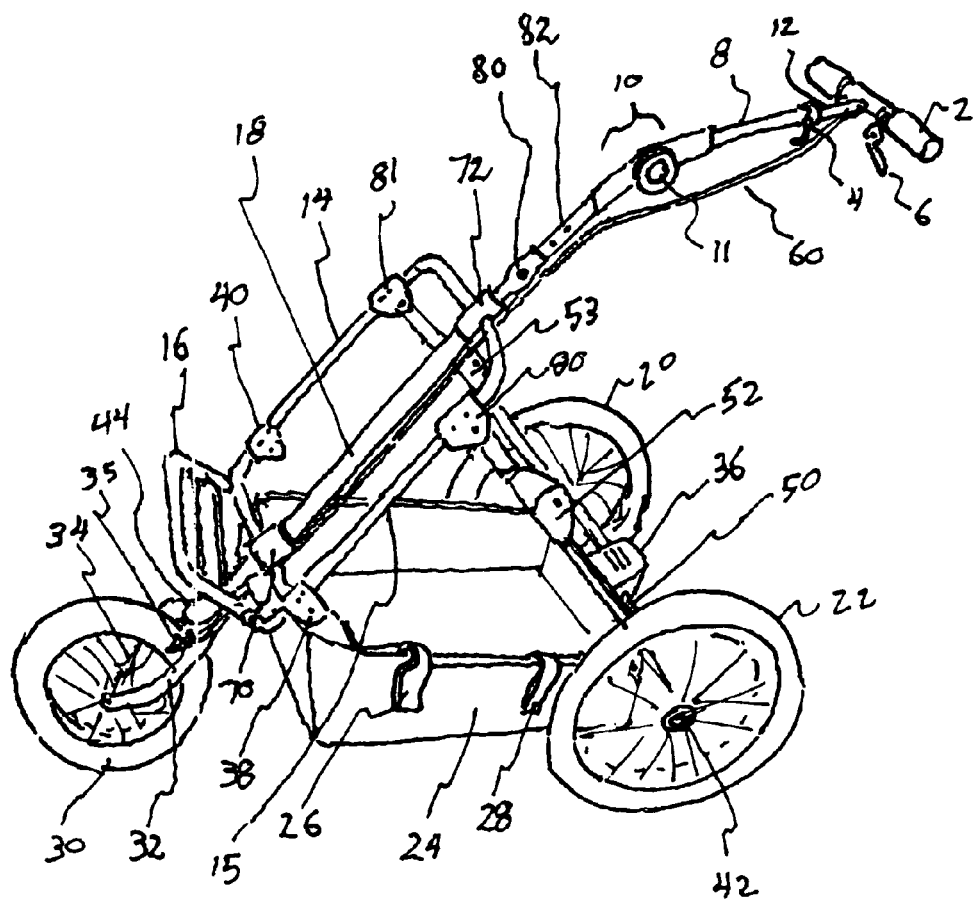
FIG. 1 is a perspective view of the invention in the use position.
Figure 2:
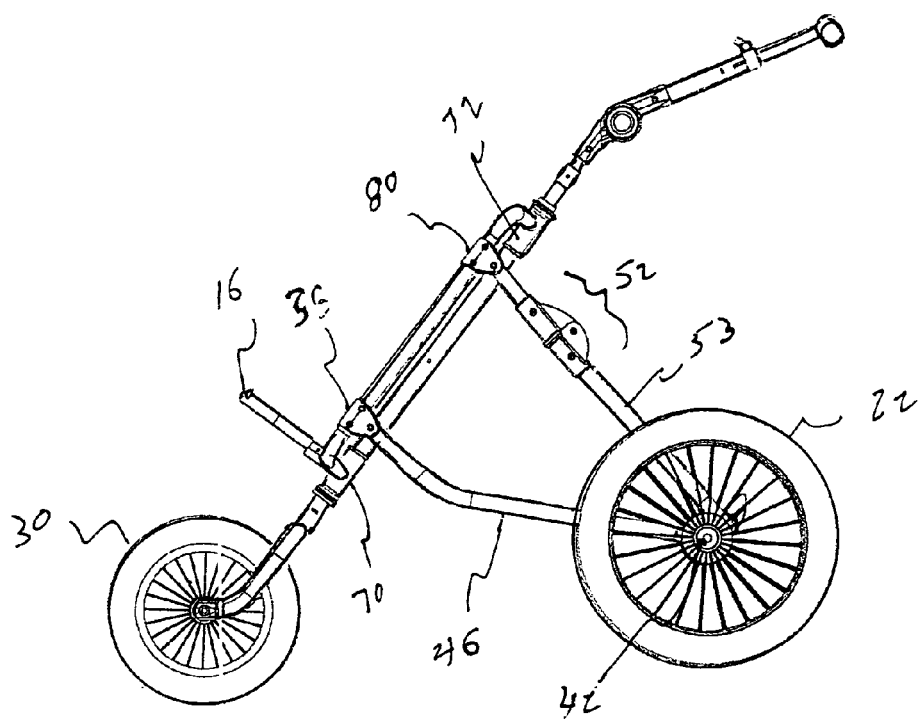
FIG. 2 is a side view of the frame of the invention.
Figure 8:
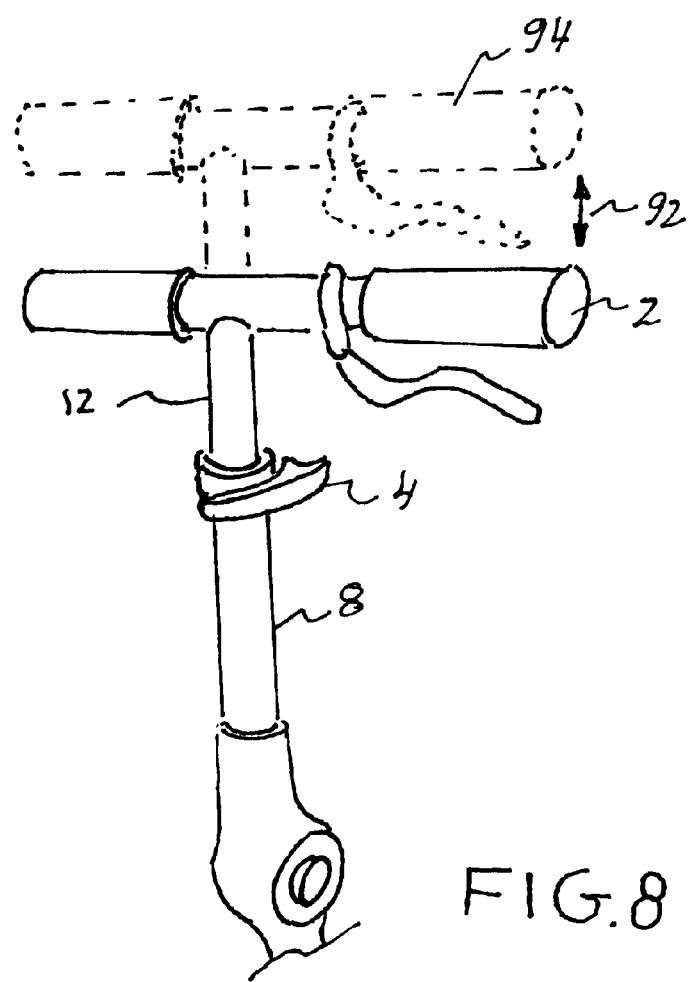
FIG. 8 is a partial perspective view of the steering and handlebar assembly.

Referring now to FIG. 1 we see a perspective view of the sports cart of the present invention 100 in the open position. The cart includes three wheels, two in the rear 20, 22 and one in the front 30. The front wheel 30 is steerable because central column 18 is rotatable within support tubes 70, 72. A basket-like holding area 24 can carry various items such as three standard bags of groceries, or sporting equipment. In the present embodiment, the basket is make of sewn fabric and held onto the cart frame by hook and loop fasteners straps 26, 28 so that the basket can be removed and for cleaning purposes. A secondary holding rack is formed by support members 14, 15 and bottom foldable rack 16. A person can lay items on the secondary holding rack and strap them in place by bungee cords, or standard flexible straps. The steering column 10 can fold at joint 10. When the user pushes in on button 11, the joint disengages, and when the user releases button 11, the joint re-engages at whatever angle the user has set it. This enables the user to set the height of the handlebars 2 to match the ideal arm location of the user. The user can fold the handle assembly 8, 12, 2 entirely for compact storage as will be show in FIG. 5. The user also has the option of sliding handlebar tube 12, in or out as show in FIG. 8. The user can also adjust the height of steering column 82 by sliding it in or out of tube 80 and locking the length by standard means such as spring pin into hole method. Both adjustment means mention above combine to create more or less distance between the handlebars 2 and the rest of the cart. When a person wishes to jog while pushing items in the cart, he or she can pull the handlebars out by releasing locking member 4 and then lock them again, and or pull out steering column 82, so that when jogging, the user's feet will not strike the rear axle of the cart. Rear wheels 20, 22 are quickly removable by pressing on axle release button 42 and a similar button for wheel 20. Front wheel holding assembly 32 is also removable from the central steering column at point 35 so that all the wheels 20, 22, 30 can be removed and stored in the basket area 24. The frame of the sports cart 100 folds in a horizontal manner via hinge members 38, 40, 52, 53, 80 and 81. Hinge members 52 and 53 are normally locked but can be temporarily unlocked by stepping on lever 36 located on the rear axle 50.

Figure 3:
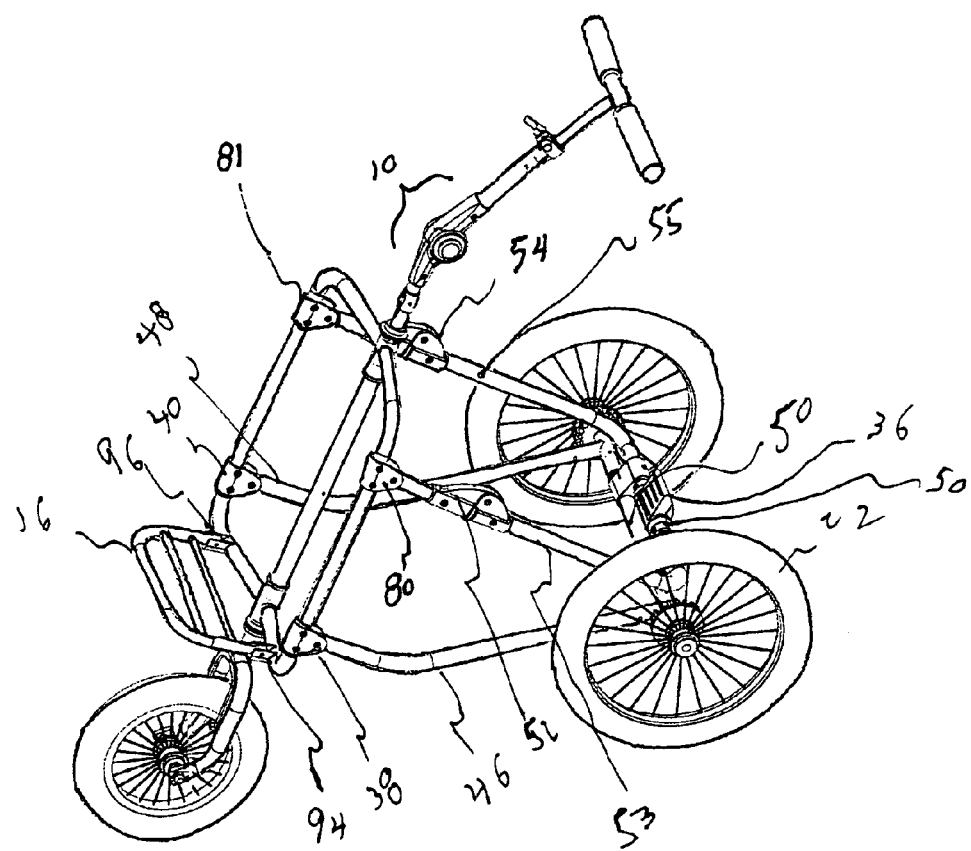
FIG. 3 is a perspective view of the frame of the invention.

FIG. 3 is a perspective view of the invention 100 without the basket 24 for clarity purposes. Lower support frame members 46, 48 can be seen in this view. Upper support frame members 53, 56 lead from the rear axle 50 to the lockable folding members 52, 54. Hinge pins 94, 96 are clearly shown Which allow bottom rack member 16 to fold up when not being used.

Figure 4:
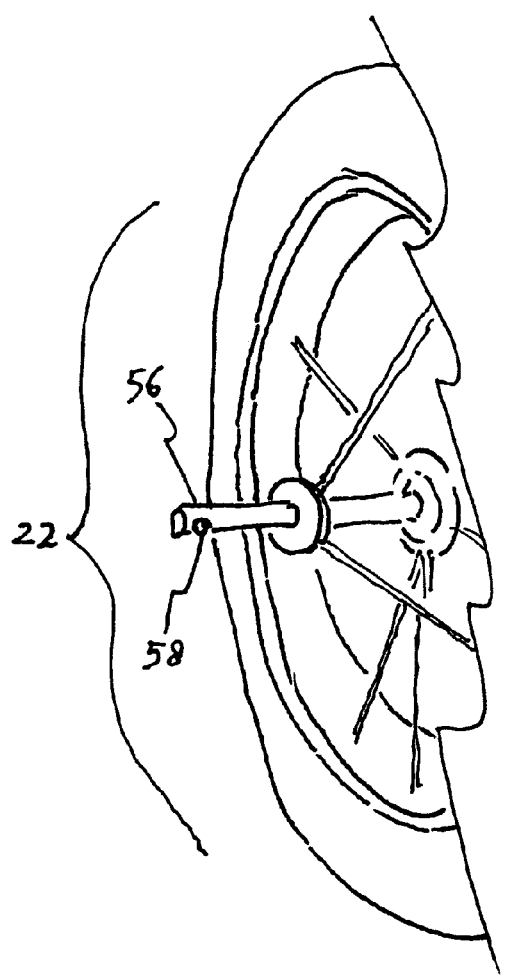
FIG. 4 is a partial perspective view of a rear wheel and aide of the present invention
Figure 6:
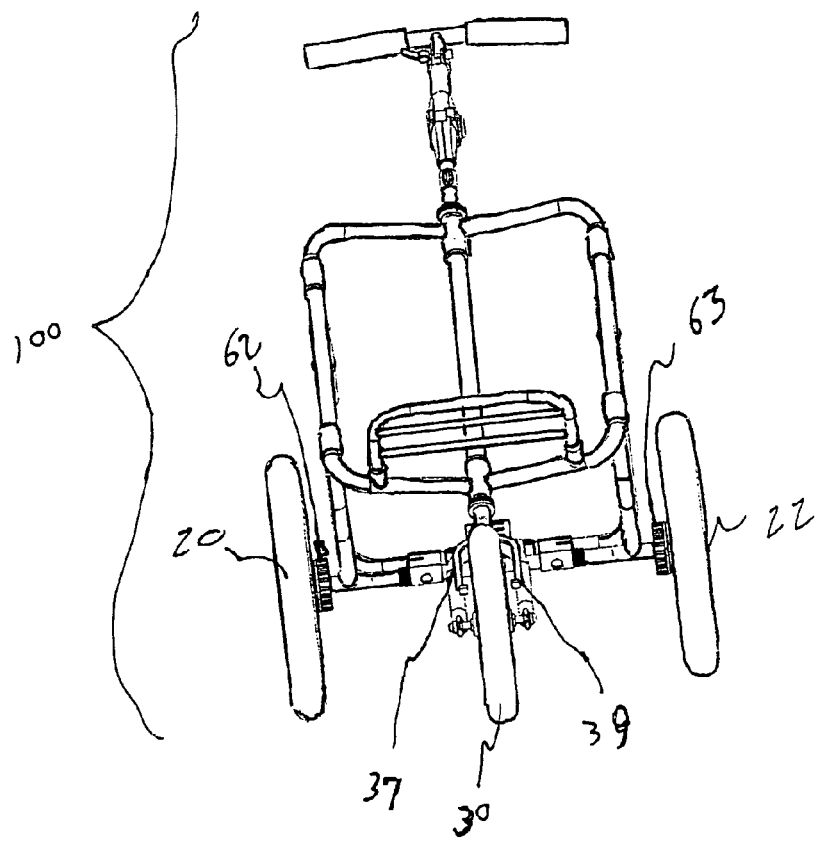
FIG. 6 is a front view of the frame of the invention.

FIG. 4 is a partial perspective view of the rear wheel 22 which shows axle 56 having a spring biased pin 58 that engages with the hollow 90 rear axle 50 as show in the storage view in FIG. 6. The user can quickly disengage the wheel axle 56 by pressing on the central hub 42 of the rear wheel 22. The wheels 22, 24 can be quickly returned to axle 50 by plugging them into axle sockets 90.

Figure 5:
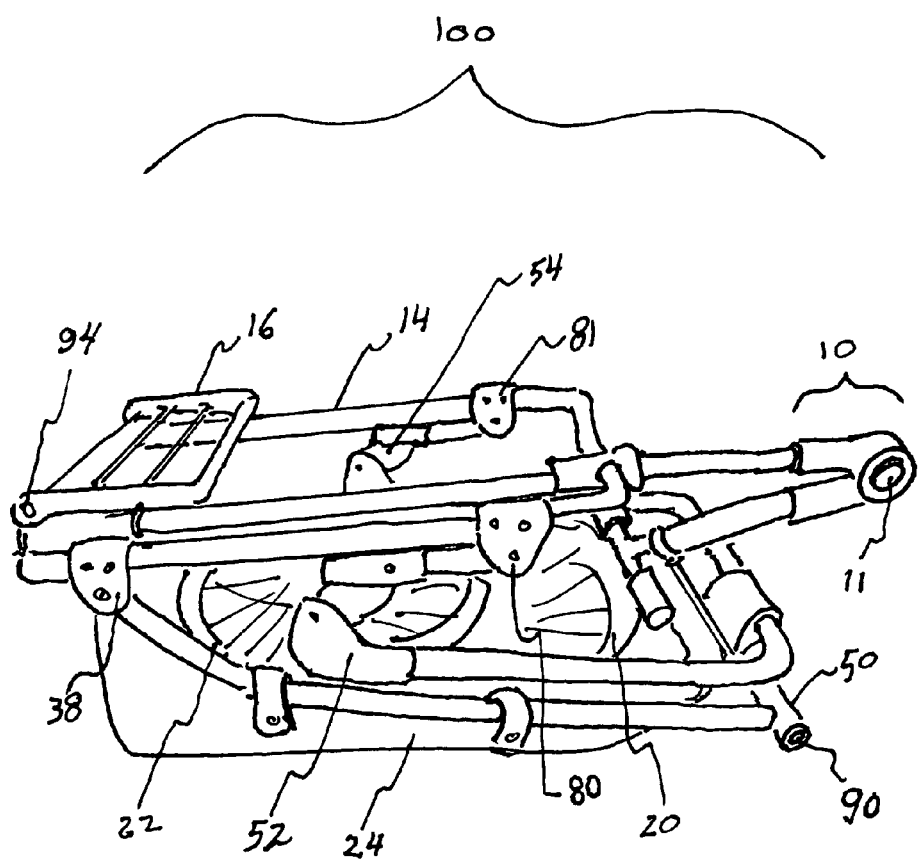
FIG. 5 is a side view of the folded version of the present invention.

FIG. 5 is a side view of the invention 100 in the folded position. Pivot points 80, 81, 52, 54 38, 40 can be seen performing their job of compressing the entire assembly into a compact mass capable of being stored in a relatively small space. Wheels 20, 22, and front wheel assembly 30, 32, 34 are stored inside basket portion 24.

FIG. 6 is a front view of the invention clearly showing front brakes 37, 39. Spur gears 62, 63 are attached to wheels 20, 22. A pawl that mates with gears 62, 63 can be engaged by the user to lock the rear wheels 20, 22 when the cart 100 is not in use and needs to remain stationary while on a slanted surface. Similar locking mechanisms are commonly found on baby strollers.

Figure 7:
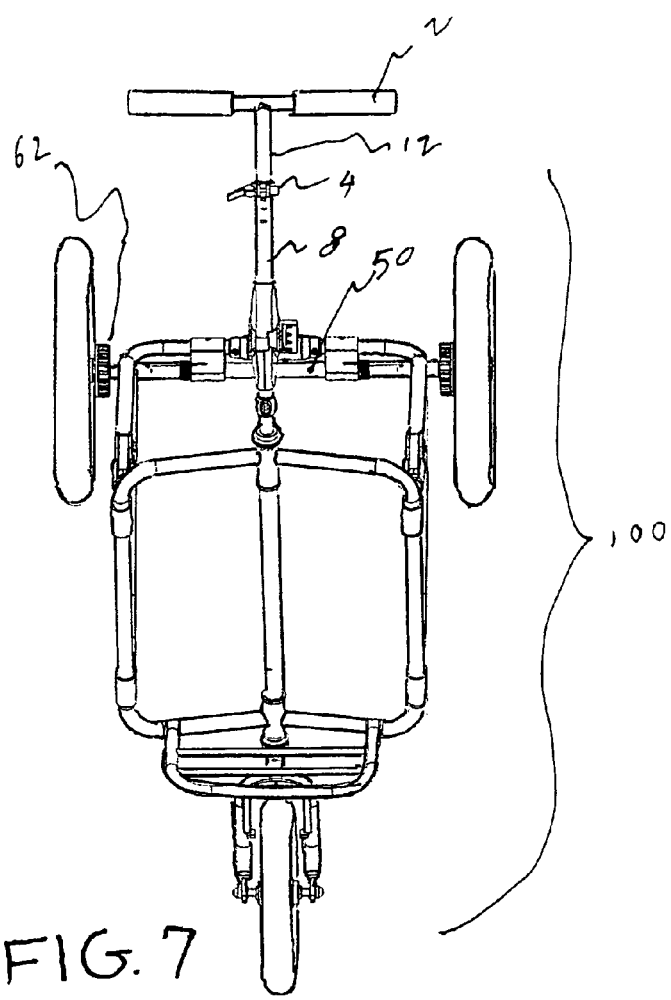
FIG. 7 is a top view of the frame of the invention.

FIG. 7 is a top view of the invention minus the lower basket. Locking lever 4 can be released to pull out or push in handlebar tube 12 thereby adjusting the distance that the handlebars 2 are from the rear wheel axle 50.

The present invention 100 provides the following advantages over other available carts:
  Mobile utility and cargo device for both genders and ages 13 and up
  Promotes outdoor exercise activities combined with practical obligations
  Assists inline skaters, joggers, pedestrians, and the handicapped.
  Provides easy manual transport of cargo incorporated into a fun and sporty design
  Alternates as a training and safety device for inline skaters utilizing hand brakes, support, and steering
  Incorporates ergonomic and orthopedic structural and adjustable feature
  Able to traverse rough road terrains and dirt trails, as well as sidewalks.
  Has front wheel brakes and locking mechanism for added security
  Optional accessories available to enhance and expand its usage
  Collapsible and lightweight for easy transport
  Pedestrian model folds into backpack for easy carrying, extremely lightweight
  Adaptable to future environments and lifestyles The preferred embodiment of the present invention 100 provides the following features:
  Safe and high performance cargo carrying shopping cart device
  Sturdy, lightweight, and collapsible
  Carries up to 75 LBS in cargo weight
  Able to traverse rough road terrains and navigate sidewalks
  Secure braking system with locking brakes for stationary situations
  Engineered to support forward center of gravity and prevent backward tipping
  Easy steering and maneuverability
  Performs as a jogger's utility device for transport of cargo
  Performs as an inline skater's training and safety device
  Sized to fit through doors and share sidewalks (like strollers and baby joggers)
  Ergonomic handles with secure and padded grips
  Adjustable height and tilt of handle bars, supporting various body weights and sizes
  Larger wheels for easy maneuvering of curbs and road irregularities
  Optional skateboard attachment for coasting and/or attachment for skate boards
  Capable of carrying various cargo and essentials, at least 3 grocery bags
  Has custom basket insert to transport small pets safely
  Sleek sporty design with various fun color options
  Assorted accessories available: such as water bottle holder, Ipod and cell phone holders; anti-theft mist strap and cable; locking storage container; variable cargo containers/baskets; headlight, reflectors, and bell or horn; security locking device (such as bike lock cables)
  Green Product: supports the reduction in driving and gasoline usage
  Health Product: promotes exercise Additional variations of the present invention include:
  Adding an optional hub motor attachment to rear wheels with battery storage capacity in cargo area for assistance with heavy weight and steep slopes.

A smaller version of the invention 100 can include:
  Modified frame to reduce overall size
  Smaller wheels, no brakes
  Smaller cargo area
  No secondary support rack
  Folds into backpack for easy carrying, extremely light weight.

Another modified version performs as a walker, but looks like a sports cart and is:
  Engineered to support upright posture
  Stable and sturdy enough to support weight bearing load as an assisted walker Dual performance as a walking assisted utility device for transport of cargo capable of including a fold-down seat attachment While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A sports cart comprising:
    a rigid, hinged tubular folding frame, comprising:
        a central steering column,
        a pair of support members rigidly connected to the central steering column, and extending to both sides of the central column,
        a bottom foldable rack,
        a pair of lower support frame members,
        a pair of upper support frame members,
        a front fork assembly, and
        a handlebar assembly;
    a pair of rear wheels;
    a centrally located front wheel;
    a lower basket member;
    a brake member;
    a lever;
    a folding and locking joint connecting the steering column to the handlebar assembly;
    a telescoping member within the steering column;
    a pair of lockable folding members enabling the folding of the upper support frame members;
    hinge members pivotally connecting:
        the pair of support members to the lower support frame members,
        the pair of lower support frame member to the upper support frame members, and
        the upper support frame members to the pair of support members,
    wherein activation of the lever enables the frame to collapse to the ground in a substantially horizontal format;
    said lower basket member being attached to the lower support frame members;
    a pair of hinge pins pivotally connecting the bottom foldable rack to the pair of support members; and
    wherein said front wheel, front wheel fork, and said rear wheels detach from the frame and are capable of fitting within said lower basket member.

2. A sports cart as claimed in claim 1 further comprising a bicycle braking assembly engaging said front wheel.

3. A sports cart as claimed in claim 1 wherein said rear wheels can be temporarily locked when not in use.

4. A sports cart as claimed in claim 1 wherein said steering column is telescoping.

5. A sports cart as claimed in claim 1 wherein said handle assembly's folding locking joint can be adjusted in height and angle by the user.

6. A sports cart as claimed in claim 1 comprising said handlebars that directly influence said front wheel motion that directly influences navigation, thus enabling control when used with jogging or rollerblading.

7. A sports cart as claimed in claim 1 with said lower basket member structured to contain up to 3 grocery bags.

* * * * *